Figure 1:
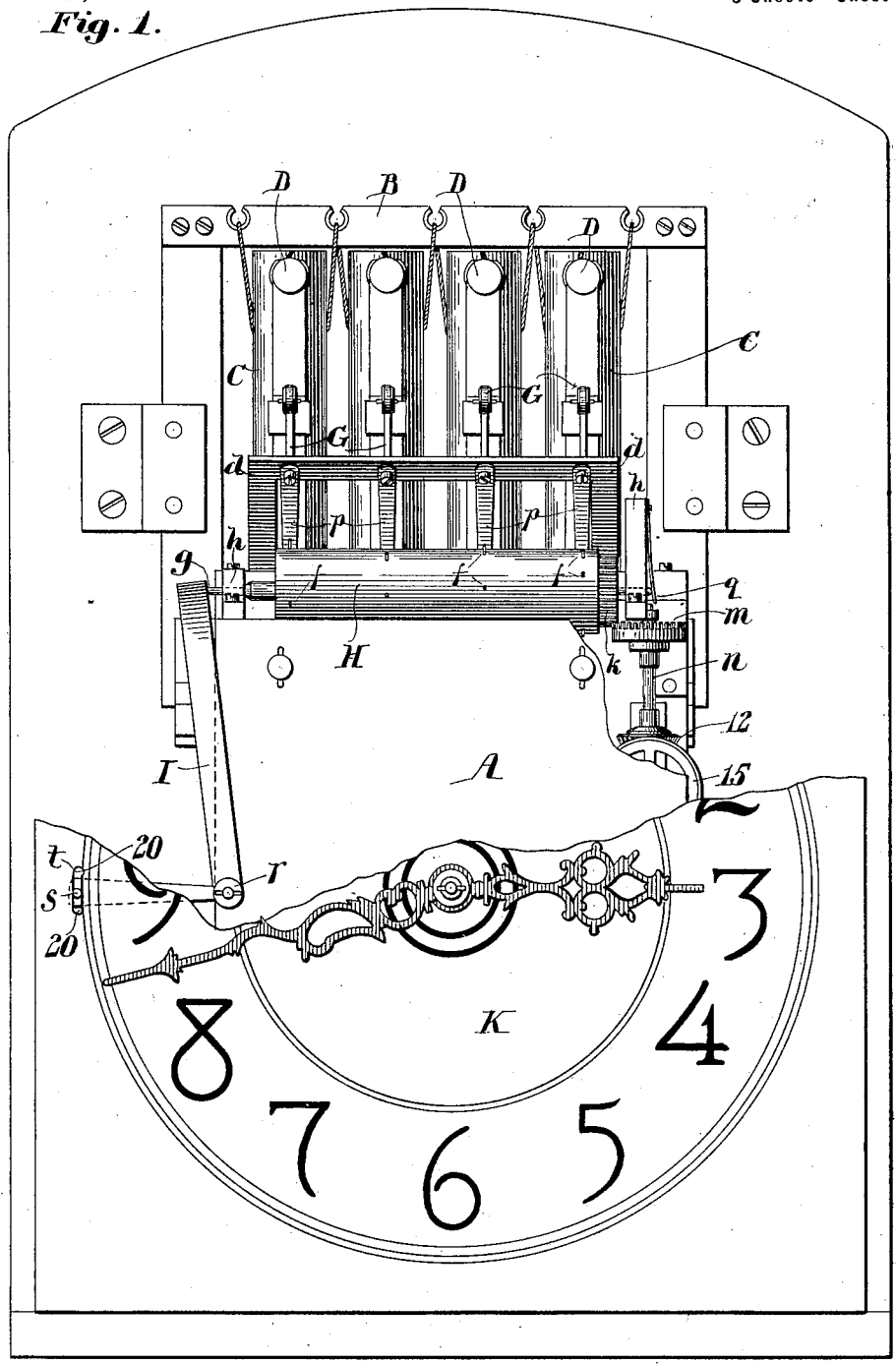

No. 699,303. Patented May 6, 1902.
T. J. FOX.
CHIMING MECHANISM FOR CLOCKS.
(Application filed Nov. 14, 1901.)
(No Model.) 5 Sheets—Sheet 1.

Witnesses:
Walter E Lombard
F. B. Spaulding

Inventor:
Thomas J. Fox,
by Teschemacher
Atty.

No. 699,303. Patented May 6, 1902.
T. J. FOX.
CHIMING MECHANISM FOR CLOCKS.
(Application filed Nov. 14, 1901.)

(No Model.) 5 Sheets—Sheet 2.

Witnesses:
Walter E. Lombard
F. B. Spaulding

Inventor:
Thomas J. Fox,
by F. E. Teschemacher
Atty.

No. 699,303. Patented May 6, 1902.
T. J. FOX.
CHIMING MECHANISM FOR CLOCKS.
(Application filed Nov. 14, 1901.)
(No Model.) 5 Sheets—Sheet 3.

Witnesses:
Walter E. Lombard
F. B. Spaulding

Inventor:
Thomas J. Fox,
by F. C. Teschemacher
Atty.

No. 699,303. Patented May 6, 1902.
T. J. FOX.
CHIMING MECHANISM FOR CLOCKS.
(Application filed Nov. 14, 1901.)

(No Model.) 5 Sheets—Sheet 4.

Witnesses:
Walter E. Lombard.
F. B. Spaulding

Inventor:
Thomas J. Fox,
by Teschemacher Atty.

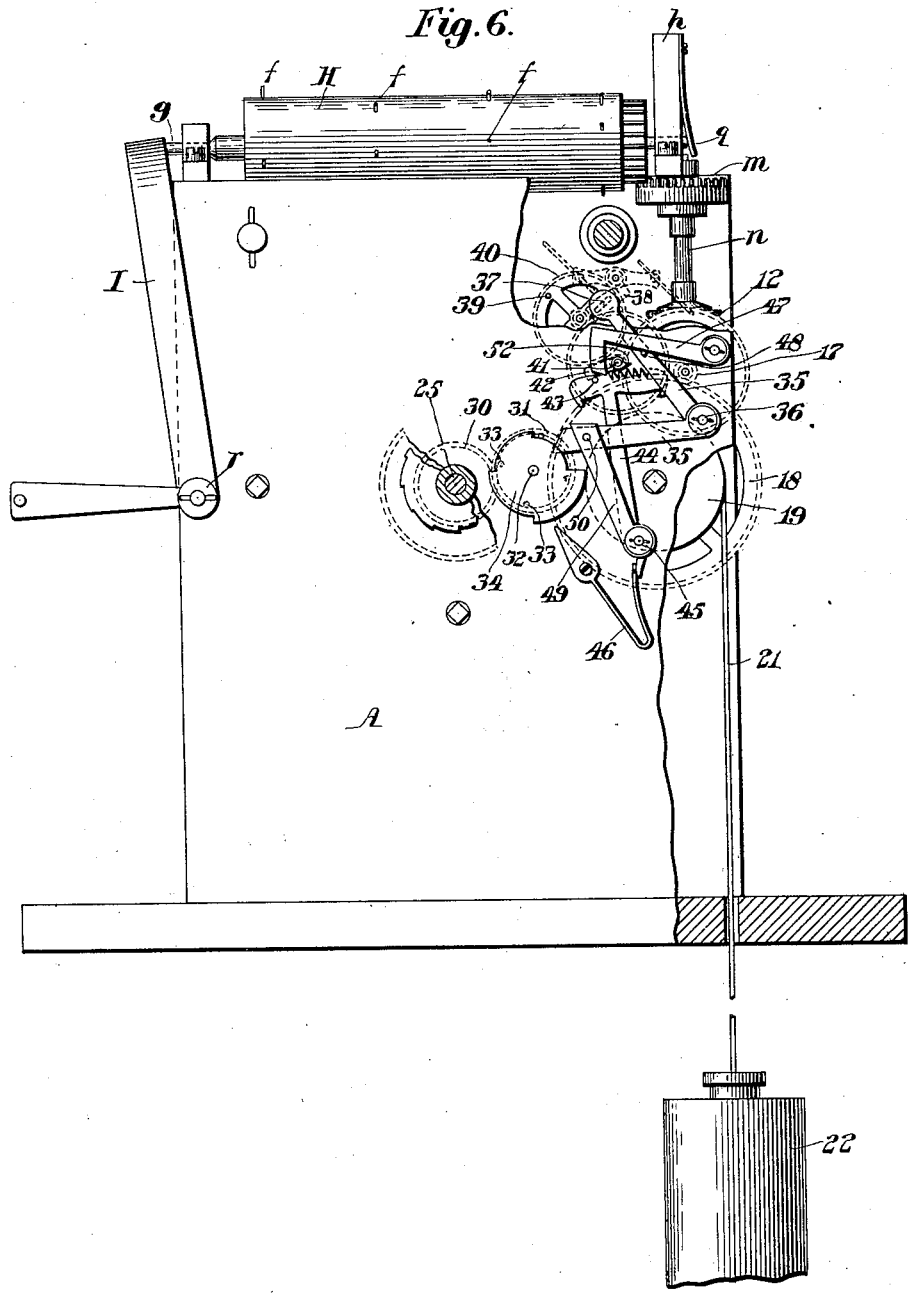

UNITED STATES PATENT OFFICE.

THOMAS J. FOX, OF BOSTON, MASSACHUSETTS, ASSIGNOR TO BIGELOW, KENNARD & CO., OF BOSTON, MASSACHUSETTS, A FIRM.

CHIMING MECHANISM FOR CLOCKS.

SPECIFICATION forming part of Letters Patent No. 699,303, dated May 6, 1902.

Application filed November 14, 1901. Serial No. 82,305. (No model.)

*To all whom it may concern:*

Be it known that I, THOMAS J. FOX, a citizen of the United States, residing at Boston, in the county of Suffolk and State of Massachusetts, have invented certain Improvements in Chiming Mechanism for Clocks, of which the following is a specification.

Chiming-clocks for household use are usually provided with means whereby the chiming mechanism can be shut off or rendered inoperative whenever it is desired that the chimes should remain silent—for instance, at night—and for this purpose it has heretofore been customary to employ a stop for locking the chiming-train and preventing the rotation of the chime-cylinder, which carries the pins for actuating the hammers or lifts. As, however, a different chime or scale is sounded for each quarter-hour, it follows that when the chiming mechanism has been stopped or shut off and it is again desired to release it care must be taken to do so at a time between the quarter-hour last struck and the one immediately following it. Otherwise a disarrangement of the chimes will be produced, necessitating the employment of a skilled person to properly rearrange the mechanism, and as the time when the chiming mechanism was shut off is not always remembered this disarrangement is an event of frequent occurrence. To overcome this difficulty is the object of my invention, which consists in the combination, with a chime-cylinder movable in the direction of its length and provided with a series of hammer-actuating pins, of a shifting or shut-off device for producing an endwise movement of said cylinder to carry its entire series of pins out of line with the hammer levers or lifts, whereby the chimes may be shut off and the cylinder still permitted to revolve, as usual, at each quarter-hour, thus enabling the pins to be maintained at all times in their proper relative positions with respect to the hammer levers or lifts at each particular quarter-hour, so that it is immaterial at what time the shut-off device is operated to again bring the chimes into action, as the pins will always be in their proper positions to sound at each quarter-hour the particular chime or scale belonging thereto, the disarrangement of the chimes being thus rendered impossible and the trouble and annoyance hitherto resulting from this cause entirely avoided.

Figure 2:
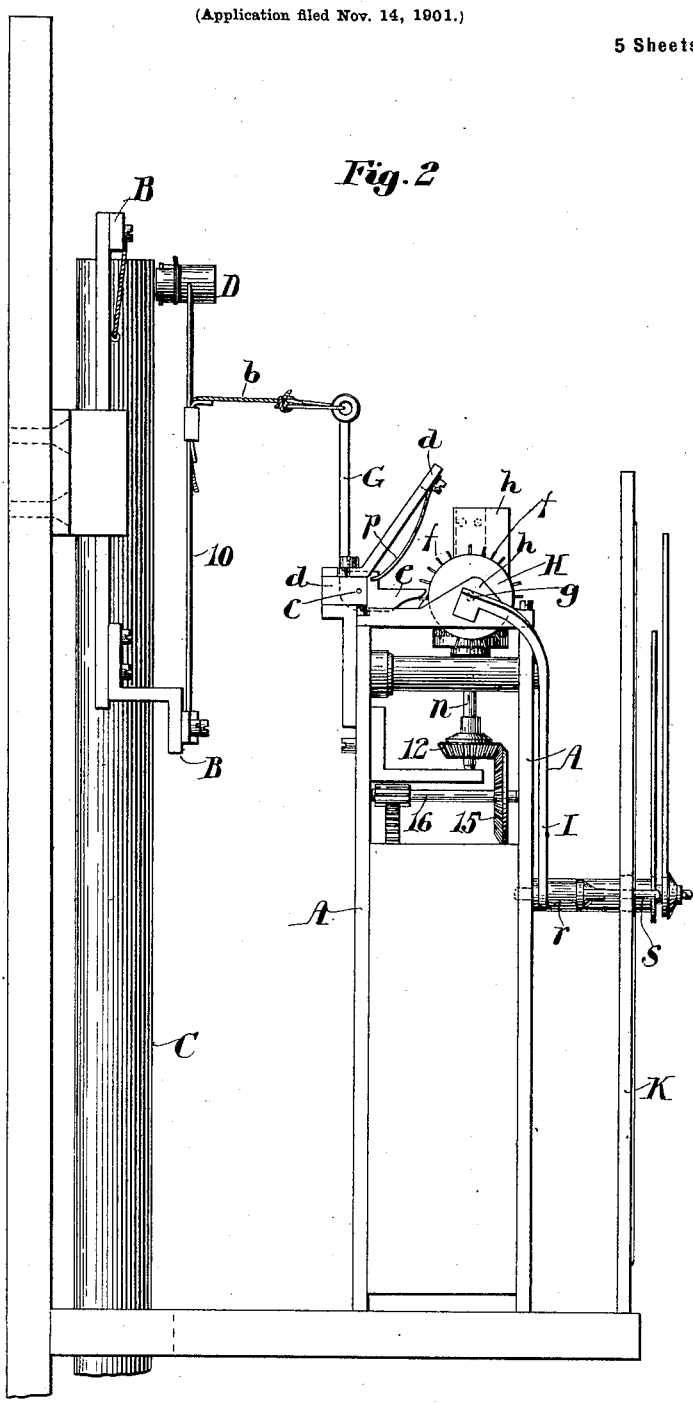
Figure 3:
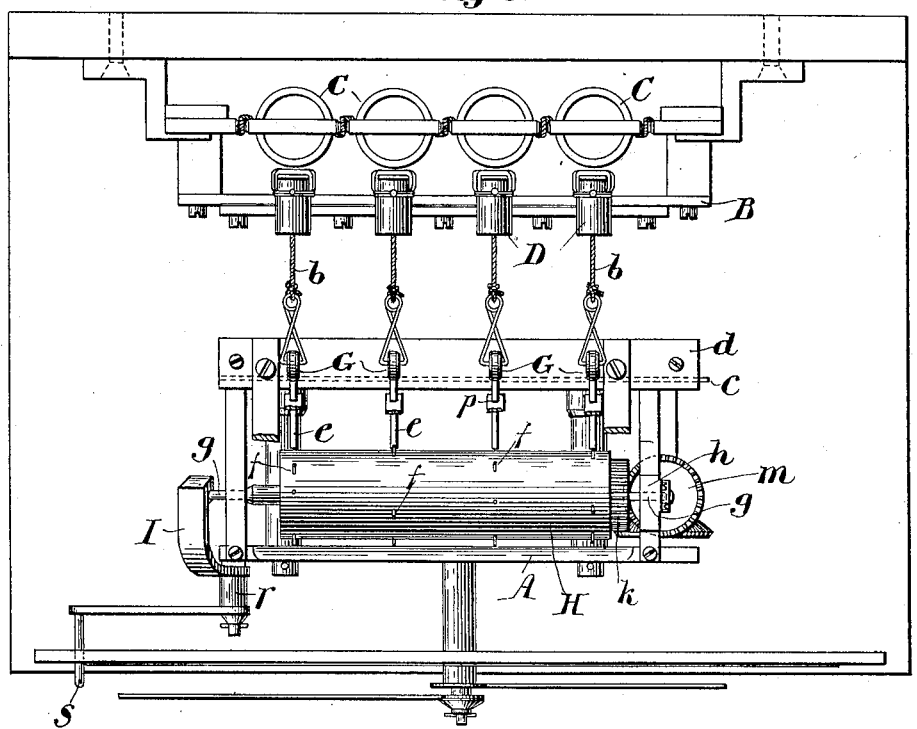
Figure 4:
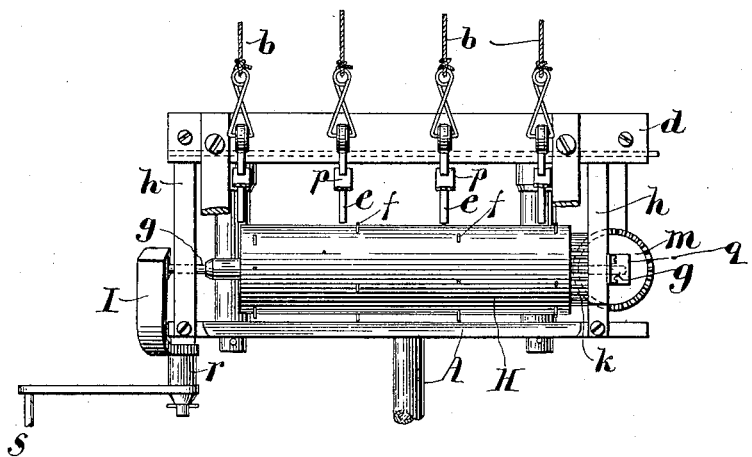
Figure 5:
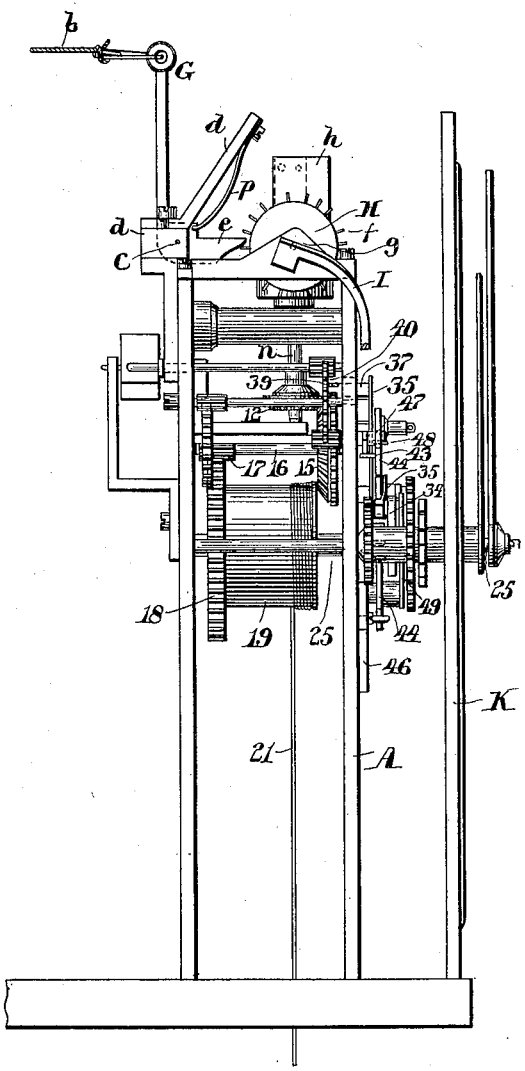

In the accompanying drawings, Figure 1 is a front elevation of a portion of a clock-movement provided with my improved chiming mechanism. Fig. 2 is an end elevation of the same. Fig. 3 is a plan view of the same, showing the chime-cylinder in the position which it occupies when its pins are in line with the tails of the hammer levers or lifts, a portion of the hammer-lever-supporting frame being broken away to show the parts behind the same. Fig. 4 is a similar plan view showing the chime-cylinder moved in the direction of its length by the shut-off lever to carry its pins out of line or range with the tails of the hammer-levers to shut off the chimes. Fig. 5 is an end elevation of a portion of the clock-movement, showing the chiming-train and its winding-barrel. Fig. 6 is a front elevation of the clock-movement with the dial-plate and hands removed and portions of the front plate of the framework broken away to show parts behind the same.

In the said drawings, A represents the framework of a clock-movement, at the rear of which are suspended from a frame B in the usual manner a series of tubular bells C, upon which the chimes are struck by a series of hammers D, the spring-shanks 10 of which are secured at their lower ends to the frame B and are connected in the usual manner by cords *b* with a series of hammer-actuating levers or lifts G, pivoted at *c* to a supporting-frame *d* and having angular tails *e*, adapted to be acted upon and depressed at the proper times by pins *f*, projecting from a horizontally-arranged chime-cylinder H, fast on a shaft *g*, the journals of which are slidably supported in bearings *h* on the framework A to permit of a longitudinal movement of the cylinder H for a purpose to be hereinafter explained.

To one end of the shaft *g* is secured a wide-faced spur-gear *k*, with which meshes a horizontal crown-wheel *m*, secured to the upper end of a vertical shaft *n*, carrying at its lower end a bevel-gear 12, which meshes with a bevel-gear 15 on a shaft 16, carrying a pinion 17, which meshes with a gear 18 on the winding-barrel 19 of the chiming-train, around which is wound a cord 21, to which is attached the weight 22, whereby when the chiming-train is periodically released by the going or time train the usual rotations of the chime-cylinder will be produced to sound the chimes at the desired times. The width of the teeth of the spur-gear $k$ is sufficient to keep it in mesh with the crown-wheel $m$ during the longitudinal movement of the cylinder H and its shaft $g$.

The chiming-train is periodically released by the time-train or going part in the following manner:

To the minute-hand arbor 25 of the time-train is secured a toothed wheel 30, which meshes with a toothed wheel 31, mounted on a stud 32, and provided with four equidistant pins 33, said wheel 31 having secured to its hub a snail 34, having four steps, one for each quarter-hour.

35 is a bell-crank lever fulcrumed at 36, the lower arm of this lever extending into the path of the pins 33, by which it is lifted before each quarter-hour, the upper arm of said lever 35 carrying at its outer end an inclined flat stop-plate 37, which extends through a slot 38 in the front plate of the framework and is brought into the path of a pin 39 on one of the wheels 40 of the chiming-train when the lever 35 is lifted by one of the pins 33, as described.

One of the arbors 41 of the chiming-train, which extends through the front plate, is provided with a crank-arm 42, which rests against a stop-pin 43, projecting from a rack 44, which is pivoted at its lower end on a stud 45, and is acted upon by a spring 46, whereby it is forced over to the left when released, said rack being held in the position shown in Fig. 6 by a retaining-pawl 47, which engages the last tooth of the rack. Against the under side of the pawl 47 bears a pin 48, projecting from the upper arm of the lever 35, so that as said lever is raised by one of the pins 33 of the wheel 31 the pawl 47 will be lifted to release the rack 44, which will then be swung over to the left by the spring 46 as far as permitted by a lever 49, connected with the rack 44, and pivoted on the same stud 45, the lever 49 having a pin 50, which when the rack 44 is released by the rise of the pawl 47 drops onto one of the steps of the snail 34, the distance of the step from the center of the snail determining the amount of movement to the left of the rack 44 when released. When the rack 44 is released and moved to the left, its stop-pin 43 is moved out of the way of the crank-arm 42, thus releasing the chiming-train, which, however, is immediately stopped by the pin 39 of the wheel 40 coming into contact with the stop-plate 37 of the lever 35, previously moved into the path of said pin, as before described, which is termed "giving warning." When the minute-hand reaches the termination of each quarter-hour, the lever 35 has been moved upward by one of the pins 33 of the wheel 31 sufficiently to withdraw its stop-plate 37 from under the pin 39 of the wheel 40, which thus releases the chiming-train, when the chime-cylinder will be revolved as required to sound the chimes.

The arbor 41, which carries the crank-arm 42, is provided at the rear of said arm with a single-tooth or gathering pallet 52, which as the arbor revolves successively engages and takes up the teeth of the rack 44, moving it to the right a distance of one tooth at each revolution, the pawl 47 retaining the rack as it is gathered up, so that if said rack when released has been moved to the left a distance of one tooth only it will require but a single revolution of the arbor 41 and tooth 52 to bring the stop-pin 43 again into a position to intercept the revolving arm 42, when the chiming-train will be stopped ready to be again released by the next pin 33 of the wheel 31, as before described. When the minute-hand points to the hour, the pin 50 of the lever 49 will drop onto the lowest step of the snail 34, and the rack 44 will then be swung over to its extreme limit, when it will require four revolutions of the arbor 41 and pallet 52 to gather up the rack sufficiently to bring its stop-pin 43 into position to intercept the crank-arm 42 of said arbor and stop the chiming-train, the amount of rotation of the chime-cylinder being in this manner increased at each succeeding quarter-hour to produce the particular chime belonging thereto.

The above-described mechanism whereby the chiming-train is periodically released by the time-train is of the usual well-known construction and forms no part of my present invention.

The striking-train is released to sound the hour after the chimes have been sounded by the usual mechanism, which is not here shown.

The pins $f$ are arranged around the cylinder H in the usual manner to produce the appropriate scale or chime at the termination of each quarter-hour or other desired divisional part of an hour, and each lever or lift G is returned to its normal position after a pin $f$ has passed out of contact with its tail $e$ by a flat spring $p$, secured to the frame $d$ and bearing against said lever. The chime-cylinder H is retained in its chime-operating position with its pins $f$ in line with the tails $e$ of the levers G by a flat spring $q$, which bears against one end of the shaft $g$, and against the opposite end of this shaft bears the upper end of a shut-off lever I, fulcrumed on a stud $r$, projecting from the framework A, the lower arm of the lever I being provided with a spring pin or handle $s$, which projects outwardly through a slot $t$ in the clock-dial K, as shown in Fig. 1, where it can be easily reached by the hand, the lever being held in either of its extreme positions by the pin $s$ falling into a round notch 20 at the end of the slot. When it is desired to shut off the chimes, so that they will remain silent, as is often required, the lever I is moved by means of its pin $s$ in the proper direction to cause its upper end to act on the end of the shaft $g$, and thereby move the cylinder H in the direction of its length against the resistance of the spring $q$ a sufficient distance to carry all of its pins $f$ out of line or range with the lever-tails $e$, thus leaving the chime-cylinder H free to revolve at each quarter-hour, as usual, but without acting on the tails of the hammer-actuating levers, and consequently as there is no locking up or interruption of the periodical operation of the chime-cylinder it will be obvious that the proper relative positions of its pins $f$ with respect to the tails $e$ of the hammer levers or lifts at each quarter-hour will remain undisturbed, so that they will always be ready to sound the proper chime or scale belonging to each quarter-hour without regard to the time at which the shut-off lever I might happen to be moved to shift the cylinder H back to its normal chiming position, making it entirely unnecessary to recollect the particular time at which the chimes were shut off, as has always been necessary with any shut-off device hitherto in use in order that the proper chime might be struck at the next succeeding quarter-hour, and by thus rendering it impossible to disarrange the chimes much trouble and expense are avoided, as it has hitherto often become necessary to send long distances for skilled persons to rearrange the chiming mechanism when out of order.

What I claim as my invention, and desire to secure by Letters Patent, is—

1. In a chiming-clock, the combination with a time mechanism, of the chimes, a hammer mechanism therefor, a chime-cylinder having pins for actuating the hammer mechanism, means permanently geared to the chime-cylinder for rotating it, means whereby the pins on the chime-cylinder and the hammer mechanism may be thrown into and out of operative relation with respect to each other, and means for periodically releasing or setting in action the chime-cylinder-rotating mechanism from the time mechanism to sound the chimes, whereby, when the cylinder-pins and the hammer mechanism are thrown out of operative relation, the periodical revolution of the said cylinder will continue in regular order with respect to the hammer-operating mechanism.

2. In a chiming-clock, the combination with a time mechanism, of the chimes, a hammer mechanism therefor, a chime-cylinder having pins for actuating the hammer mechanism, means for moving the cylinder bodily to throw its pins into and out of the path of the hammer mechanism, means permanently geared to the chime-cylinder for rotating it, and means for periodically releasing or setting in action the chime-cylinder-rotating mechanism from the time mechanism to sound the chimes, whereby when the chime-cylinder is moved to throw its pins out of operative relation with the hammer mechanism, its periodical revolutions will continue in regular order with respect to the hammer-operating mechanism without disturbing the relative relation of its pins to the hammer-actuating mechanism.

3. In a chiming-clock, the combination with a time mechanism, of the chimes, a hammer mechanism therefor including hammer-levers, a longitudinally-movable chime-cylinder provided with a series of pins for actuating the hammer-levers, means for moving the cylinder longitudinally to throw its pins into and out of the paths of said hammer-levers, means permanently in gear with said chime-cylinder for rotating the same, means for periodically releasing or setting in action the chime-cylinder-rotating mechanism from the time mechanism, whereby longitudinal movement of the chime-cylinder will not interfere with its rotary movement and thus the relative relation of the cylinder-pins and hammer-levers be maintained.

4. In a chiming-clock, the combination with a time mechanism, of the chimes, a hammer mechanism therefor including hammer-levers, a longitudinally-movable chime-cylinder provided with a series of pins for actuating the hammer-levers, a spring holding the cylinder with its pins in register with the hammer-levers, a shut-off lever to move the chime-cylinder against the action of its spring, a wide gear on the chime-cylinder, a driving pinion or gear in permanent mesh with said wide gear and forming part of the chime-train, whereby the chime-cylinder will be rotated whenever released without any relative change between its pins and the hammer-levers, and means for periodically releasing the chime-train from the time mechanism.

Witness my hand this 11th day of November, A. D. 1901.

THOMAS J. FOX.

In presence of—
P. E. TESCHEMACHER,
F. B. SPAULDING.